US008521660B2

(12) United States Patent
Nguyen et al.

(10) Patent No.: US 8,521,660 B2
(45) Date of Patent: Aug. 27, 2013

(54) CONDENSED SVM (75) Inventors: Duc Dung Nguyen, Saitama (JP);
Kazunori Matsumoto, Saitama (JP);
Yasuhiro Takishima, Saitama (JP)

(73) Assignee: KDDI Corporation, Tokyo (JP)

( * ) Notice: Subject to any disclaimer, the term of this patent is extended or adjusted under 35 U.S.C. 154(b) by 884 days.

(21) Appl. No.: 12/692,965

(22) Filed: Jan. 25, 2010

(65) Prior Publication Data

US 2010/0191683 A1   Jul. 29, 2010

(30) Foreign Application Priority Data

Jan. 29, 2009 (JP) ................................ 2009-018011

(51) Int. Cl.
*G06F 15/18* (2006.01)
*G06K 9/62* (2006.01)

(52) U.S. Cl.
CPC .................................. *G06K 9/6269* (2013.01)
USPC ........................................................... 706/12

(58) Field of Classification Search
USPC ........................................................... 706/12
See application file for complete search history.

(56) References Cited

U.S. PATENT DOCUMENTS

2005/0049990 A1 * 3/2005 Milenova et al. ................ 706/48

OTHER PUBLICATIONS

Nguyen, Duc Dung et al.; "Two-stage Incremental Working Set Selection for Support Vector Training"; 2008; Proceedings of the 19th Data Engineering Workshop of Electronics, Information and Communication Engineers; 7 pages.*

Nguyen, Duc Dung et al.; "An Efficient Method for Simplifying Support Vector Machines"; Proceedings of the 22nd International Conference on Machine Learning; pp. 617-624.*
Nguyen, Duc Dung et al.; "A Bottom-Up Method for Simplifying Support Vector Solutions"; 2006; IEEE Transactions on Neural Networks, vol. 17, No. 3; pp. 792-796.*
Nugyen, Duc Dung et al.; "Two-stage Incremental Working Set Selection for Support Vector Training"; 2008; Proceedings of the 19th Data Engineering Workshop of Electronics, Information and Communication Engineers; 7 pages.*
Nguyen, Duc Dung et al.; "An Efficient Method for Simplifying Support Vector Machines"; 2005; Proceedings of the 22nd International Conference on Machine Learning; pp. 617-624.*
Cortes, C et al, "Support Vector Networks", Machine Learning, 1995, vol. 20, pp. 273-297.
Osuna, E et al, "An Improved Training Algorithm for Support Vector Machines", Neural Networks for Signal Processing VII—Proceedings of the 1997 IEEE Workshop, 1997, New York, pp. 276-285.

(Continued)

*Primary Examiner* — Jeffrey A Gaffin
*Assistant Examiner* — Stanley K Hill
(74) *Attorney, Agent, or Firm* — Westerman, Hattori, Daniels & Adrian, LLP (57) ABSTRACT

The present invent ion provides a condensed SVM for high-speed learning using a large amount of training data. A first stage WS selector samples a plurality of training data from a training data DB, selects an optimal training vector $x_t$ among the plurality of training data, and outputs it to the WS manager. After the first stage finishes, a second stage WS selector extracts training data one by one from the training data DB and selects training data $x_t$ satisfying optimality and outputs it to the WS manager. An SVM optimizer extracts training data closest to the training data $x_t$ selected by the first and second stage WS selectors from the WS being managed by the WS manager, and condenses the two first and second training data to one training data when the distance between these is smaller than a predetermined value.

2 Claims, 4 Drawing Sheets

(56) References Cited

OTHER PUBLICATIONS

Joachims, T, "Making Large-Scale Support Vector Machine Learning Practical", Advances in Kernel Methods: Support Vector Machines, 1998, MIT Press, pp. 1-13.

Platt, J, "Fast Training of Support Vector Machines Using Sequential Minimal Optimization", Advances in Kernel Methods-Support Vector Learning, 1999, MIT Press, Cambridge, MA, pp. 41-63.

Nguyen, D.D. et al, "Two-Stage Incremental Working Set Selection for Fast Support Vector Training on Large Datasets", Research, Innovation and Vision for the Future, 2008, RIVF 2008, IEEE International Conference, Jul. 2008, pp. 221-226.

Collobert, R et al, "A Parallel Mixture of SVMs for Very Large Scale Problems", Neural Computation, 2002, vol. 14, No. 5, pp. 1105-1114.

Graf, H. P. et al, "Parallel Support Vector Machine: The Cascade SVM", Advances in Neural Information Processing Systems, 2005, vol. 17, MIT Press.

Lee, Y.J. et al, "RSVM: Reduced Support Vector Machines", Proceedings of the First SIAM International Conference on Data Mining, 2001, San Francisco, CA, pp. 1-17.

Bordes, A et al, "Fast Kernel Classifiers With Online and Active Learning", Journal of Machine Learning Research, 2005, vol. 6, pp. 1579-1619.

Tsang, I.W. et al, "Core Vector Machines: Fast SVM Training on Very Large Datasets", J. Mach. Learn. Res., 2005, vol. 6, pp. 363-392.

Burges, C.J.C. et al, "Simplified Support Vector Decision Rules", Proceedings of te 13th International Conference on Machine Learning, 1996, pp. 71-77, San Mateo, CA.

Nguyen, D.D. et al, "A Bottom-Up Method for Simplifying Support Vector Solutions", IEEE Transactions on Neural Networks, 2006, vol. 17, No. 3, pp. 792-796.

\* cited by examiner

Decomposition framework for SVM training

Initialization

1. $T = B_0 \cup N_0$
2. Find initial SVM solution $f_0$ on $B_0$

Main optimization loop
  3. Set iteration t = 1
  4. While Stopping Condition is not satisfied
  5.     Update $B_t \rightarrow B_{t+1}, N_{t+1} = T - B_{t+1}$
  6.     Find new SVM solution $f_{t+1}$ on $B_{t+1}$
  7.     t = t + 1
  8. Endwhile

Fig. 7

CONDENSED SVM

The present application is claims priority of Japanese Patent Application Serial No. 2009-018011, filed Jan. 29, 2009, the content of which is hereby incorporated by reference in its entirety.

BACKGROUND OF THE INVENTION

1. Field of the Invention

The present invention relates to an SVM (Support Vector Machine) for classifying many objects based on their multiple characteristics, more specifically, to a condensed SVM for high-speed training using a large collection of data.

2. Description of the Related Art

Given training data $x_i$ (here, i=1, 2, ..., I) with labels $y_i$ of −1 and +1, a major task of SVM learning is to solve the following quadratically constrained quadratic programming problem (QP problem) of Formula 1.

[Formula 1]

$$\min_\alpha L(\alpha) = \frac{1}{2}\sum_{i,j=1}^{l} y_i y_j \alpha_i \alpha_j K(x_i, x_j) - \sum_{i=1}^{l} \alpha_i \quad (1)$$

$$\text{subject to } \sum_{i=1}^{l} y_i \alpha_i = 0,$$

$$0 \le \alpha_i \le C_i (i = 1, \ldots, l)$$

Where $K(x_i, x_j)$ is a kernel function for calculating an inner product between two vectors $x_i$ and $x_j$ in some feature spaces, and $C_i$ (i=1, 2, ..., I) is a parameter penalizing noisy training data in the given training data.

When attempting to solve the above problem, the following difficulties arise when the number Is of the training data becomes larger.

1) Problem in capacity of a memory storing the kernel matrix $K_{ij}=K(x_i, x_j)$ (here, i, j=1, 2, ..., I). The data amount of the kernel matrix easily exceeds the memory capacity of a conventional computer.
2) Computational complexity to compute a kernel value $K_{ij}$ (i, j=1, 2, ..., I).
3) Computational complexity to solve the QP problem.

In the testing phase, the decision function f(x) of SVM is expressed by Formula 2, and is composed of a set of Ns training data $x_i$ (i=1, 2, ..., Ns) called support vectors (SVs).

[Formula 2]

$$f(x) = \sum_{i=1}^{N_S} \alpha_i K(x_i, x) + b \quad (2)$$

Complexity of the decision function f(x) of the SVM linearly increases as the number Ns of support vectors increases. When this number becomes larger, the speed of SVM in the testing phase becomes slower due to an increase in the amount of computations of the kernel value $K(x_i, x)$ (i=1, 2, ..., Ns).

Therefore, conventionally, the following various methods have been proposed to improve the scalability of the support vector learning in both the training and testing phases.

1. Decomposition Algorithms (the Following Non-Patent Documents 2, 3, 4, and 5)

The decomposition method decomposes the original QP into a series of much smaller QPs, and then optimizes these sub-problems. Training data are divided into two parts: a set of active vectors and a set of inactive vectors. In the set of active vectors or working set, the coefficient $\alpha_i$ can be updated. On the other hand, in the set of inactive vectors, the coefficient $\alpha_i$ is temporarily fixed. The optimization algorithm runs only on a small number of working data, not on the whole data. Therefore, the problem in which the memory capacity increases by a square and computational complexity increases by a cube is avoided. In each optimization loop, the working data are updated to find a new SVM solution. The process training (learning) will finish when optimal conditions are satisfied.

2. Parallelization (the Following Non-Patent Documents 6 and 7)

The training speed of SVM can be improved effectively by using a parallel algorithm running on a parallel computer.

3. Data Sampling (the Following Non-Patent Documents 8, 9, and 10)

Various methods for selecting important training data have been proposed to reduce the size of the optimization problem of Formula 1. An SVM which is learned from a small amount of data can have good performance in many cases.

4. Reduced Set Method for SVM Simplification (the Following Non-Patent Documents 11 and 12)

To increase the speed of SVM in the testing phase, a reduced set method replaces the SVM decision function (see Formula 2) having Ns SVs by a simplified SVM decision function consisting of Nz vectors called reduced vectors (Nz<Ns). It is practically shown that the reduced set method can produce a simplified SVM with similar performance to that of the conventional SVM.

Non-Patent Document 1: C. Cortes and V. Vapnik, "Support vector networks," Machine Learning, vol. 20, pp. 273-297, 1995.

Non-Patent Document 2: E. Osuna, R. Freund, and F. Girosi, "An improved training algorithm for support vector machines," in Neural Networks for Signal Processing VII—Proceedings of the 1997 IEEE Workshop, N. M. J. Principe, L. Gile and E. Wilson, Eds., New York, pp. 276-285, 1997.

Non-Patent Document 3: T. Joachims, "Making large-scale support vector machine learning practical," in Advances in Kernel Methods: Support Vector Machines, A. S. B. Scholkopf, C. Burges, Ed., MIT Press, Cambridge, Mass., 1998.

Non-Patent Document 4: J. Platt, "Fast training of support vector machines using sequential minimal optimization," in Advances in Kernel Methods-Support Vector Learning, B. Scholkopf, C. J. C. Burges, and A. J. Smola, Eds., Cambridge, Mass.: MIT Press, 1999.

Non-Patent Document 5: Duc Dung Nguyen; Matsumoto, K.; Takishima, Y.; Hashimoto, K.; Terabe, M., "Two-stage incremental working set selection for fast support vector training on large datasets," Research, Innovation and Vision for the Future, 2008. RIVF2008. IEEE International Conference on, vol., no., pp. 221-226, 13-17 Jul. 2008.

Non-Patent Document 6: R. Collobert, S. Bengio, and Y. Bengio, "A parallel mixture of svms for very large scale problems," Neural Computation, vol. 14, no. 5, pp. 1105-1114, 2002.

Non-Patent Document 7: G. H. Peter, C. Eric, B. L'eon, D. Igor, and V. Vladimir, "Parallel support vector machines:

The Cascade SVM," in Advances in Neural Information Processing Systems, L. Saul, Y. Weiss, and L. Bottou, Eds., vol. 17. MIT Press, 2005.

Non-Patent Document 8: Y.-J. Lee and O. L. Mangasarian, "Rsvm: Reduced support vector machines," in Proceedings of the First SIAM International Conference on Data Mining. Morgan Kaufmann, San Francisco, Calif., 2001.

Non-Patent Document 9: A. Bordes, S. Ertekin, J. Weston, and L. Bottou, "Fast kernel classifiers with online and active learning," Journal of Machine Learning Research, vol. 6, pp. 1579-1619, 2005.

Non-Patent Document 10: I. W. Tsang, J. T. Kwok, and P.-M. Cheung, "Core vector machines: Fast svm training on very large data sets," J. Mach. Learn. Res., vol. 6, pp. 363-392, 2005.

Non-Patent Document 11: C. J. C. Burges, "Simplified support vector decision rules," in Proc. 13th International Conference on Machine Learning, San Mateo, Calif., 1996, pp. 71-77.

Non-Patent Document 12: Nguyen, D. D., Ho, T. B. A Bottom-up Method for Simplifying Support Vector Solutions, IEEE Transactions on Neural Networks, Vol. 17, No. 3, 792-796, 2006.

The methods have the following problems:

1. Decomposition Algorithms

When working on a large amount of data (e.g. training data more than 100,000), the convergence speed becomes slow. Computational complexity increases by a cube of the number of support vectors and the memory capacity increases by a square of the number of support vectors.

2. Parallelization

Designing an algorithm suitable for making the communication cost reasonable, questions still remain in computing ability and kernel caching in practice. Moreover, improving the speed of optimization through parallelization is difficult due to dependency between computation steps.

3. Data Sampling

The biggest issue of this process is the degradation of the trained SVM because only limited information (training data) is used for optimization. In addition, it is difficult to select a suitable sampling method for each practical application.

4. Reduced Set Method for SVM Simplification

The reduced set method works on the assumption that SVM has already been trained by a training algorithm, and the task of the method is to retrain this machine. Moreover, it is required to retrain the simplified SVM and minimize a function of a variable (d+1) Nz (d is the order of the training vector). This is not an easy task especially when the number of reduced vectors Nz is large.

SUMMARY OF THE INVENTION

An object of the present invention is to provide a condensed SVM for high-speed learning using a large amount of training data.

In order to achieve the object, this invention is characterized in that a condensed SVM comprises a training database having large training data, a first stage working set (WS) selector performing repeatedly steps of selecting a plurality of training data from the training database and obtaining one optimal training vector among the plurality of training data, a second stage working set (WS) selector extracting training data one by one from the training database and selecting training data satisfying optimality after the first stage finishes, a working set (WS) manager managing the training data selected by the first and second stage WS selectors, and an SVM optimizer including means for extracting second training data closest to the first training data selected by the first and second stage WS selectors from a WS managed by the WS manager, and condensing two first and second training data to one training data when the distance between the first and second training data is smaller than a predetermined value.

This invention is further characterized in that the SVM optimizer further inspects whether non-support data exists in the WS when the distance between the first and second training data is larger than the predetermined value, and when non-support data exists, deletes the non-support data.

This invention is further characterized in that the SVM optimizer further adds the first training data to the WS when non-support data does not exist in the WS.

According to the present invention, two training data closest to each other are condensed (combined) to one training data, so that even if the number of training data increases, the number of support vectors is not greatly increased. Therefore, the SVM can learn with a small number of support vectors, so that a condensed SVM which realizes high-speed learning even when a large amount of training data is used, can be provided.

When the two training data closest to each other are larger than a predetermined value, it is inspected whether a non-support vector exists in a WS, and when a non-support vector exists, the non-support vector is deleted from the WS, so that the WS does not greatly increase. Therefore, even if a large amount of training data is used, the SVM can learn at a high speed.

The number of support vectors and the WS do not greatly increase, so that the SVM can learn by using a large amount of training data without increasing the memory capacity of the SVM.

DETAILED DESCRIPTION OF THE PREFERRED EMBODIMENTS

Figure 1:
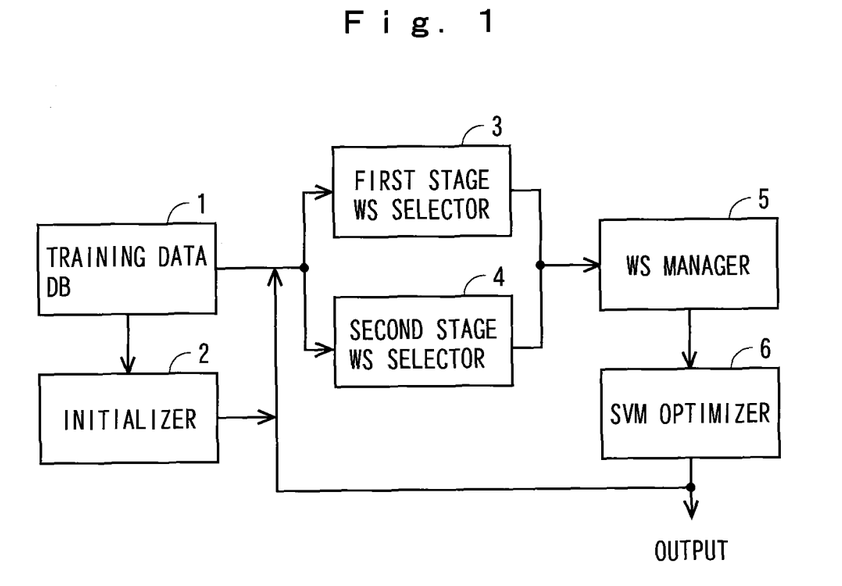
FIG. 1 is a flowchart showing an exemplary configuration of a condensed SVM of the present invention.

Hereinafter, the present invention will be described in detail with reference to the drawings. FIG. 1 is a block diagram showing an exemplary configuration of a condensed SVM of the present invention.

As shown in the figure, the condensed SVM includes a training data (or case) DB (database) 1, an SVM solution initializer 2, a first stage WS (working set) selector 3, a second stage WS (working set) selector 4, a WS manager 5, and an SVM optimizer 6.

The training data DB 1 preferably consists of training data of correct answer cases. In the initializer 2, an SVM solution is initialized.

Figure 2:
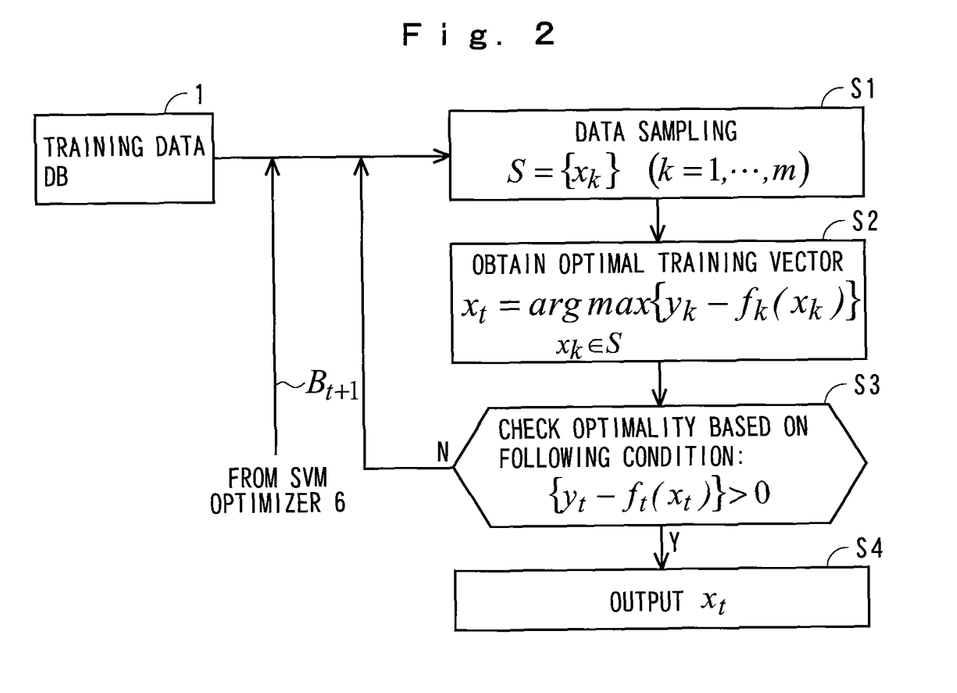
FIG. 2 is a flowchart showing a function of a first stage WS selector of FIG. 1.

The first stage WS selector 3 performs the function shown in the flowchart of FIG. 2. At Step S1, m training data $x_k$ (k=1, 2, . . . , m) are sampled from the training data DB 1, and a training data set S is formed from the sampled m training data $x_k$. At Step S2, optimal training data (vector) $x_t$ concerning a temporal SVM solution is obtained from the training data set S. The optimal training data (vector) $x_t$ can be obtained from the following formula.

[Formula 3]

$$x_t = \underset{x_k \in S}{\mathrm{argmax}}\{y_k - f_k(x_k)\} \qquad (3)$$

$y_k$ in the formula given above indicates a label value of +1 or −1, and $f(x_k)$ indicates an SVM solution of the training data $x_k$.

Next, the process proceeds to Step S3, and the optimality of the optimal training data $x_t$ is checked depending on whether the optimal training data $x_t$ satisfies the condition of $\{y_t - f_t(x_t)\} > 0$. When this condition is satisfied, the process proceeds to Step S4 and this optimal training data $x_t$ is output to the WS manager 5. On the other hand, when this condition is not satisfied, the process returns to Step S1 and new m training data $x_k$ (k=1, 2, . . . , m) are sampled from the training data DB 1, and the same operation as described above is repeated. Thus, the optimal training data (vectors) $x_t$ are output one by one from the first stage WS selector 3.

Next, the WS manager 5 receives the optimal training data (vectors) $x_t$ whose optimality has been checked from the first and second stage WS selectors 3 and 4, and updates the temporal WS (working set). The operation of the second stage WS selector 4 will be described later.

Next, the updated temporal WS is sent to the SVM optimizer 6. The function of the SVM optimizer 6 will be described with reference to the flowchart of FIG. 3.

Figure 3:
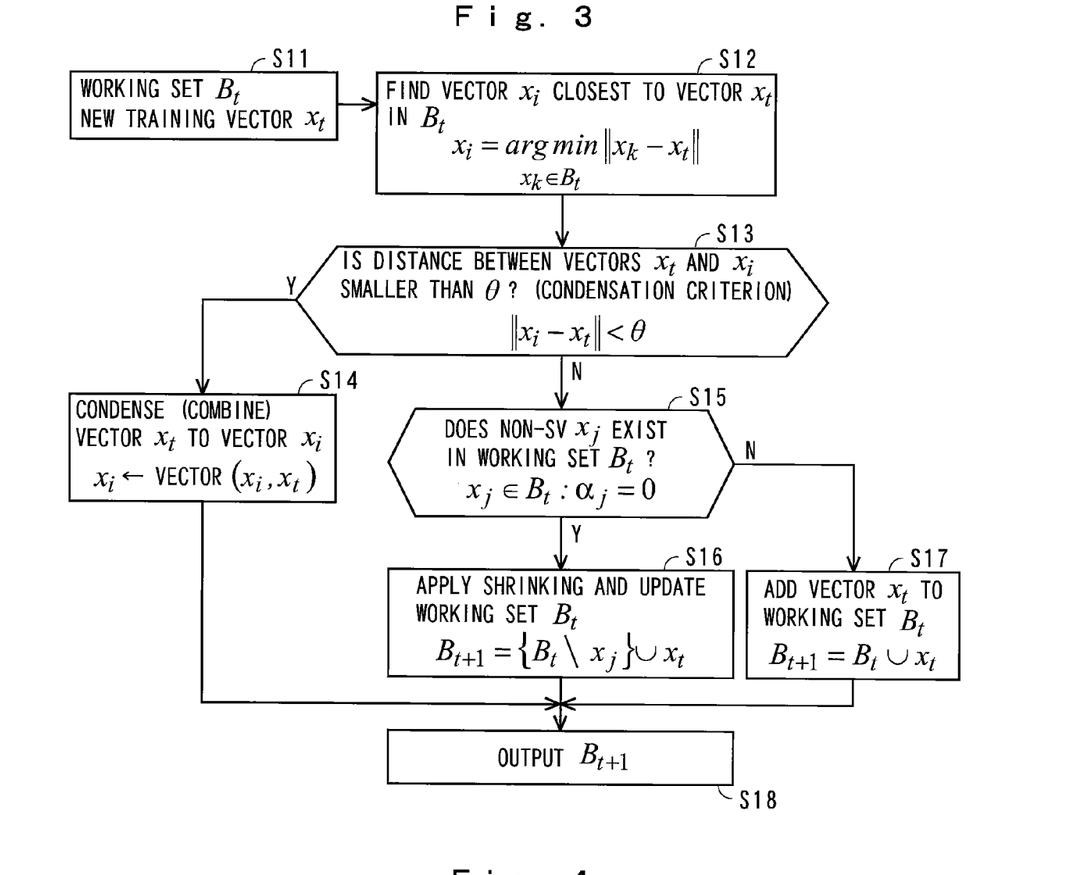
FIG. 3 is a flowchart showing a function of an SVM optimizer of FIG. 1.

At Step S11, the SVM optimizer 6 receives a new training vector $x_t$ and the temporal working set $B_t$ (hereinafter, referred to as $B_t$, simply) from the WS manager 5. Here, $B_t$ is an accumulation of training vectors $x_t$ obtained through continuous operation of the machine of FIG. 1. At Step S12, the SVM optimizer 6 searches and finds a vector $x_i$ closest to the new training vector $x_t$ in $B_t$. At Step S13, the SVM optimizer 6 determines whether the vector $x_i$ satisfies the condensation criterion. In detail, it is determined whether the distance between the vector $x_i$ and the vector $x_t$ is smaller than a predetermined value θ. When the result of this determination is affirmative, the process proceeds to Step S14, and the vector $x_t$ is condensed (combined) to the vector $x_i$. As a result, the size of $B_t$ does not increase, so that it does not change.

Figure 5:
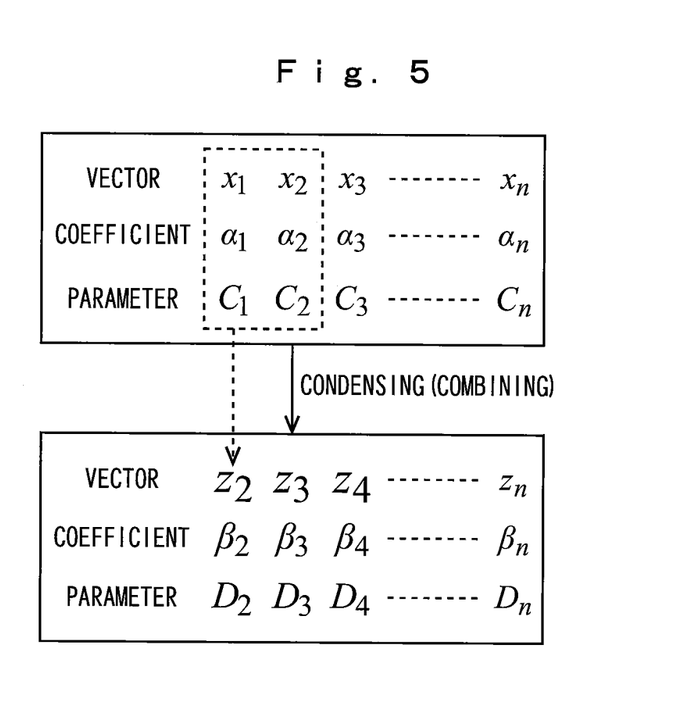
FIG. 5 is an explanatory view of an operation of condensing training vectors in the SVM optimizer.

A detailed example of the way of condensing (combining) will be described with reference to FIG. 5. Assuming a case where a condensed vector $z_2$ is generated by condensing the vector $x_1$ to $x_2$, according to this condensation, the coefficients $\alpha_1$ and $\alpha_2$ of the decision function $f(x_1)$ and $f(x_2)$ of the SVM for the vectors $x_1$ and $x_2$ are changed to $\beta_2$, and the parameters $C_1$ and $C_2$ are changed to $D_2$. The condensed vector $Z_2$, the coefficient $\beta_2$, and the parameter $D_2$ can be obtained through the following formula. The vectors $z_3$ to $Z_n$ which are not condensed are equal to $x_3$ to $x_n$, $\beta_3$ to $\beta_n$ are equal to $\alpha_3$ to $\alpha_n$, and $D_3$ to $D_n$ are equal to $C_3$ to $C_n$.

$$z_2 = \frac{C_1 x_1 + C_2 x_2}{C_1 + C_2} \qquad \text{[Formula 4]}$$

$$\beta_2 = \frac{\alpha_1 K(z_2, x_1) + \alpha_2 K(z_2, x_2)}{K(z_2, z_2)}$$

$$D_2 = \frac{C_1 K(z_2, x_1) + C_2 K(z_2, x_2)}{K(z_2, z_2)}$$

$$z_i = x_i (i = 3, \ldots, n)$$

$$\beta_i = \alpha_i (i = 3, \ldots, n)$$

$$D_i = C_i (i = 3, \ldots, n)$$

The following formula is obtained by generalizing the condensation Formula 4:

$$z = \frac{C_i x_i + C_j x_j}{C_i + C_j} \qquad \text{[Formula 5]}$$

$$\beta = \frac{\alpha_i K(z, x_i) + \alpha_j K(z, x_j)}{K(z, z)}$$

$$D = \frac{C_i K(z, x_i) + C_j K(z, x_j)}{K(z, z)}$$

When the result of Step S13 is negative, the process proceeds to Step S15, and it is determined whether a non-support vector (SV) $x_j$ exists in $B_t$. When the result of this determination is affirmative, the process proceeds to Step S16, and the non-support vector $x_j$ is removed from $B_t$, and a new training vector $x_t$ is added. As a result, the size of $B_t$ does not increase, so that it does not change. On the other hand, when the result of the determination is negative, the process proceeds to Step S17, and a new training vector $x_t$ is added to $B_t$. As a result, $B_t$ increases by the one new training vector $x_t$. At Step S18, the working set $B_{t+1}$ after being optimized is output. The working set $B_{t+1}$ is fed back to the first and second stage WS selectors 3 and 4.

Figure 6:
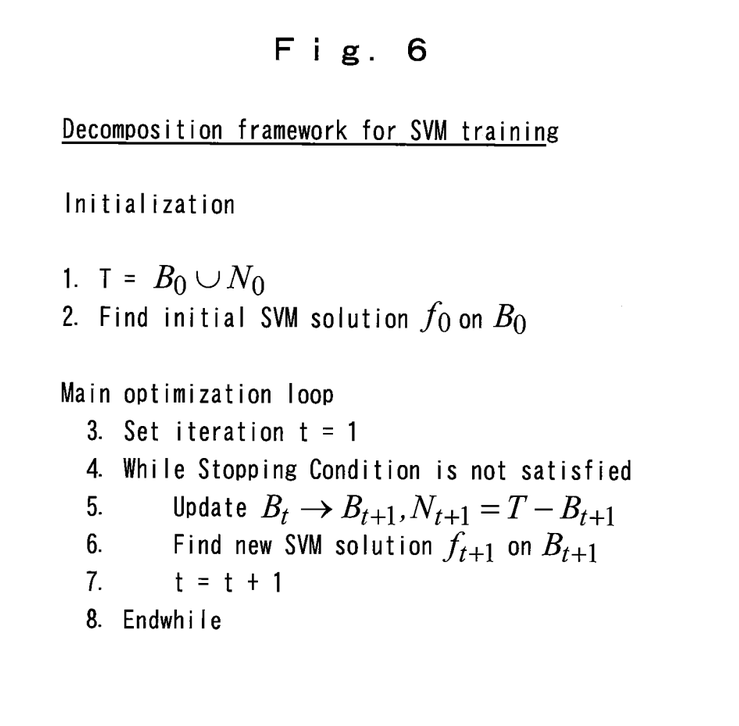
FIG. 6 is an explanatory view showing the outline of operations of the first stage.

The outline of the above-described series of operations, that is, the operations of the first stage can be expressed as in FIG. 6. T in FIG. 6 indicates the total number of training vectors, that is, T={$(x_i, y_i)$}, $y_1 = \pm 1$, (i=1, 2, . . . , l).

As is clearly understood from FIG. 6, in the first stage, the working set $B_t$ is formed so as to gradually increase from a minimum value. In each optimization loop, one training vector is selected for updating $B_t$, and a new SVM solution $f_{t+1}$ is found. This new SVM solution is used in the next cycle for selecting one new training vector.

The configuration of $B_t$ which gradually increases enables the optimization algorithm to operate only on important training vectors. Therefore, the memory requirement for accumulating the kernel matrix is minimized, and the computation amount for computing the kernel matrix and optimization is minimized.

Next, when even one of the following conditions (1) to (3) is satisfied, the operation of the first stage WS selector 3 is finished and shifted to the operation of the second stage WS selector 4.

(1) When the inactive vectors become empty, that is, "$N_{t+1}$" of FIG. 6 becomes zero.

(2) When the size of the current working set $B_t$ becomes larger than a predetermined value.

(3) When all training vectors in the training data DB 1 are selected once or more by the first stage selector 3.

Figure 4:
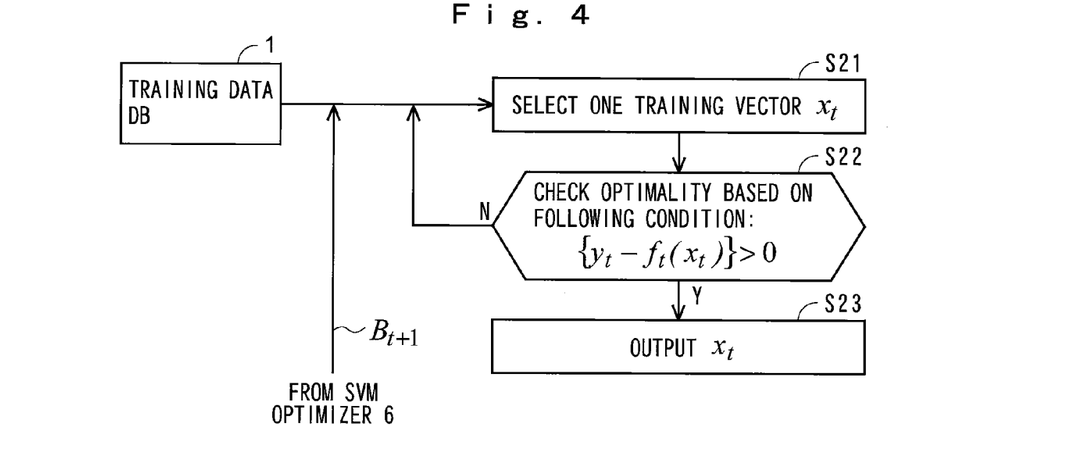
FIG. 4 is a flowchart showing a function of a second stage WS selector of FIG. 1.

Next, operations of the second stage WS selector 4 will be described with reference to the flowchart of FIG. 4.

At Step S21, one training vector $x_t$ is selected from the training data DB 1. At Step S22, the optimality of the training vector $x_t$ is checked depending on whether the optimal training data $x_t$ satisfies the condition of $\{y_t-f_t(x_t)\}>0$. When this condition is satisfied, the training vector $x_t$ is output to the WS manager 5. On the other hand, when the condition is not satisfied, the process returns to Step S21 and the next one training vector $x_t$ is selected.

This operation of the second stage WS selector 4 finishes when all of the vectors which were not selected in the first stage are selected once or more, and checked once or more at Step 22.

As described above, the present embodiment adopts a two-stage method, and in the first stage, the best optimal training vector is selected among m training vectors sampled at Step S1. An object of this selection method is to obtain a satisfactory suboptimal SVM solution at a rational cost.

In the second stage, all training data are tried one by one. Concerning a temporal SVM solution, training vectors satisfying the optimal conditions are selected for updating the working set B, and training vectors not satisfying the optimal conditions are discarded. An object of this stage is to discard unimportant training data by closely examining the SVM solution.

Specifically, the first stage shows a method for obtaining a suboptimal solution at a high speed, and the second stage shows a method for improving a solution at a high speed on condition that the suboptimal solution exists. If the process is started from a state where no suboptimal solution is obtained as in the second stage from the beginning by skipping the first stage, reach to a proper solution is not guaranteed, and therefore, normally, performance of the model of the SVM obtained through learning deteriorates. As described above, the present invention can shorten the SVM training time.

Figure 7:
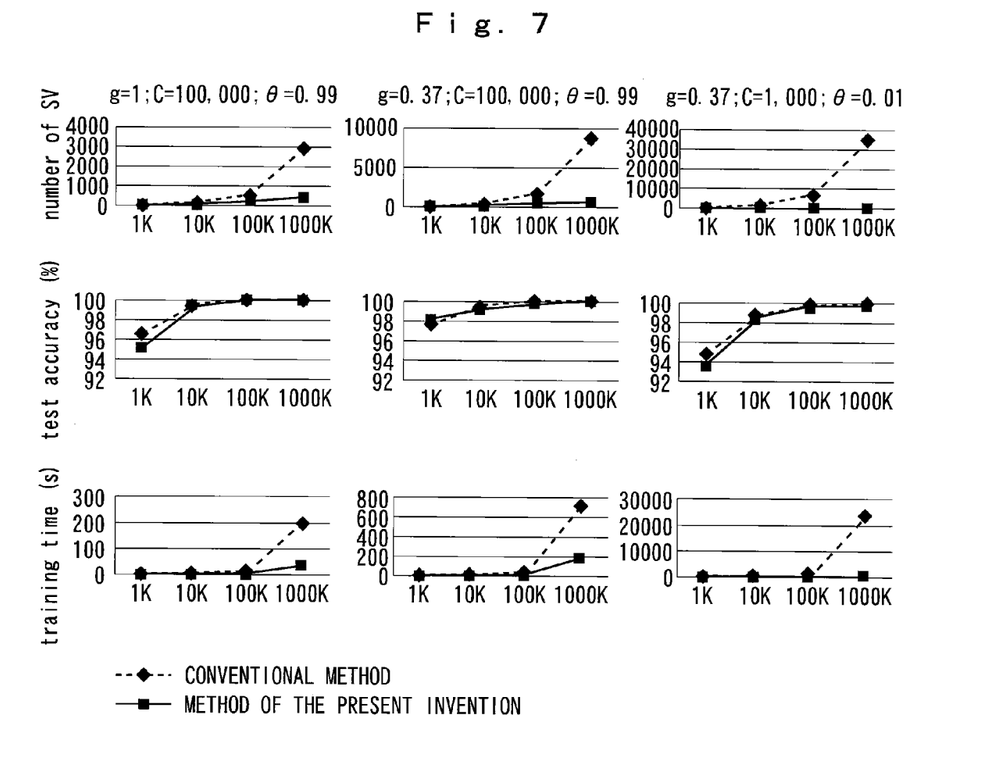
FIG. 7 is a graph for explaining differences between the method of the present invention and a conventional method.

An example of results of an experiment conducted by the present inventor for confirming the effect of the present invention is shown in FIG. 7. The horizontal axis of the graph of FIG. 7 indicates the number of training data. The highest three graphs show changes in the number of support vectors SVs when the optimization parameters (g, C, and θ) are changed as shown in the figure, the middle three graphs show changes in classification performance (test accuracy (%)), and the lowest three graphs show changes in training time (s). g of the parameters (g, C, and θ) is a parameter g when using a gamma kernel $[K(x_i, x_j)=\exp\{-g\cdot(x_i-x_j)^2\}]$ as the kernel function $K(x_i, x_j)$ of Formula 1 given above. C is C of Formula 1, and θ is θ of Step S13 of FIG. 3.

From the highest graphs, it is understood that as the number of training data increases, the number of SV increases in the conventional method, however, the number of SV does not greatly increase in the method of the present invention. From the middle graphs, it is understood that the classification performance of the method of the present invention is substantially the same as in the conventional method although the number of SV does not greatly increase as described above. From the lowest graphs, it is understood that as the number of training data increases, the training time increases in the conventional method, however, the training time does not greatly increase in the method of the present invention.

What is claimed is:

1. A condensed SVM comprising:

a training database having large training data;

selecting training data means for repeatedly selecting a plurality of training data from the training database and obtaining one optimal training vector among the plurality of training data in a first stage;

extracting training data means for extracting training data one by one from the training database and selecting training data satisfying optimality after the first stage finishes;

managing training data means for managing the training data selected by said selecting training data means and said extracting training data means;

optimizing means for extracting a second training data closest to a first training data selected by said selecting training data means and said extracting training data means from a working set (WS) managed by said managing training data means, and condensing the first and second training data to one training data when the distance between the first and second training data is smaller than a predetermined value; and condensing means for condensing the two first and second training data to one training data that obtains a condensed vector z, a coefficient β, and a parameter D from the following formula: when the first and second training data are $x_i$ and $x_j$, coefficients are $\propto_i$ and $\propto_j$, and parameters are $C_i$ and $C_j$, $$z = \frac{C_i x_i + C_j x_j}{C_i + C_j},$$

$$\beta = \frac{\propto_i K(z, x_i) + \propto_j K(z, x_j)}{K(z, z)},$$

$$D = \frac{C_i K(z, x_i) + C_j K(z, x_j)}{K(z, z)},$$

where K is a kernel function.

2. A condensed SVM comprising:

a training database having large training data;

selecting training data means for repeatedly selecting a plurality of training data from the training database and obtaining one optimal training vector among the plurality of training data in a first stage;

extracting training data means for extracting training data one by one from the training database and selecting training data satisfying optimality after the first stage finishes;

managing training data means for managing the training data selected by said selecting training data means and said extracting training data means;

optimizing means for extracting a second training data closest to a first training data selected by said selecting training data means and said extracting training data means from a working set (WS) managed by said managing training data means, and condensing the first and second training data to one training data when the distance between the first and second training data is smaller than a predetermined value; and condensing means for condensing the two first and second training data to one training data that obtains a condensed vector z, a coefficient β, and a parameter D from the following formula: when the first and second training data are $x_i$ and $x_j$, coefficients are $\propto_i$ and $\propto_j$, and parameters are $C_i$ and $C_j$, $$z = \frac{C_i x_i + C_j x_j}{C_i + C_j},$$

$$\beta = \frac{\propto_i K(z, x_i) + \propto_j K(z, x_j)}{K(z, z)},$$

-continued
$$D = \frac{C_i K(z, x_i) + C_j K(z, x_j)}{K(z, z)},$$

where K is a kernel function,
wherein said optimizing means further inspects whether non-support data exists in the WS when the distance between the first and second training data is larger than the predetermined value, and when non-support data exists, deletes the non-support data.

* * * * *